(12) United States Patent
Holecek et al.

(10) Patent No.: US 10,794,303 B2
(45) Date of Patent: Oct. 6, 2020

(54) METHOD AND DEVICE FOR CONTROLLING A TURBOCHARGER

(71) Applicant: INNIO Jenbacher GmbH & Co OG, Jenbach, Tirol (AT)

(72) Inventors: Jakub Holecek, Innsbruck (AT); Guenther Wall, Bad Haring (AT)

(73) Assignee: INNIO Jenbacher GmbH & Co OG, Jenbach (AT)

( * ) Notice: Subject to any disclaimer, the term of this patent is extended or adjusted under 35 U.S.C. 154(b) by 155 days.

(21) Appl. No.: 16/064,463

(22) PCT Filed: Dec. 7, 2016

(86) PCT No.: PCT/AT2016/060119
§ 371 (c)(1),
(2) Date: Nov. 13, 2018

(87) PCT Pub. No.: WO2017/112965
PCT Pub. Date: Jul. 6, 2017

(65) Prior Publication Data
US 2019/0072045 A1 Mar. 7, 2019

(30) Foreign Application Priority Data
Dec. 29, 2015 (AT) .................. A51107/2015

(51) Int. Cl.
*F02D 41/00* (2006.01)
*F02B 37/16* (2006.01)
(Continued)

(52) U.S. Cl.
CPC .......... *F02D 41/0007* (2013.01); *F02B 37/16* (2013.01); *F02B 37/18* (2013.01);
(Continued)

(58) Field of Classification Search
CPC .. F02B 37/16; F02B 37/18; F02D 2200/0406; F02D 41/0007; F02D 41/22; Y02T 10/144; F02M 35/0208; F02M 35/09
See application file for complete search history.

(56) References Cited

U.S. PATENT DOCUMENTS 5,604,306 A * 2/1997 Schricker ............. B01D 46/448
                                                                73/114.31
5,606,311 A    2/1997 Polidan et al.
(Continued)

FOREIGN PATENT DOCUMENTS

DE         19630985 A1   3/1997
DE     102008025549 A1  12/2009
(Continued)

OTHER PUBLICATIONS

First Office Action issued in connection with corresponding AT Application No. A51107/2015 dated Jun. 24, 2016 (English Translation Not Available).
(Continued)

*Primary Examiner* — Jesse S Bogue
(74) *Attorney, Agent, or Firm* — Fletcher Yoder, P.C.

(57) ABSTRACT

A method for establishing a permitted maximum differential pressure of an air filter arranged in an intake tract of an internal combustion engine is provided. The method includes determining a control reserve of the internal combustion engine and establishing the maximum permissible differential pressure of the air filter as a function of the determined control reserve.

20 Claims, 3 Drawing Sheets

(51) Int. Cl.
  *F02M 35/09*    (2006.01)
  *F02M 35/02*    (2006.01)
  *F02B 37/18*    (2006.01)
  *F02D 41/22*    (2006.01)

(52) U.S. Cl.
  CPC ......... *F02D 41/22* (2013.01); *F02M 35/0208* (2013.01); *F02M 35/09* (2013.01); *F02D 2200/0406* (2013.01); *Y02T 10/144* (2013.01)

(56) References Cited

U.S. PATENT DOCUMENTS

| | | |
|---|---|---|
| 8,534,123 B2 | 9/2013 | Herman et al. |
| 8,626,456 B2 | 1/2014 | Moore et al. |
| 9,061,224 B2 | 6/2015 | Verdegan et al. |
| 1,016,320 A1 | 12/2018 | Kopecek et al. |
| 10,323,599 B2* | 6/2019 | Dudar ................ F02D 41/0002 |
| 10,598,136 B2* | 3/2020 | Naruse ................ F02M 35/09 |
| 2003/0221480 A1* | 12/2003 | Aschner ................ F02M 35/09 73/114.34 |
| 2008/0190177 A1 | 8/2008 | Wiggins et al. |
| 2011/0067678 A1 | 3/2011 | Burkhardt et al. |
| 2011/0197580 A1* | 8/2011 | Andrasko ................ F02D 23/00 60/602 |
| 2011/0238331 A1 | 9/2011 | Moore et al. |
| 2011/0307160 A1 | 12/2011 | Verdegan et al. |
| 2011/0308308 A1 | 12/2011 | Herman et al. |
| 2012/0317974 A1* | 12/2012 | Rollinger ................ F02D 41/22 60/602 |
| 2013/0036804 A1* | 2/2013 | Uehara ................ F02M 35/09 73/114.31 |
| 2015/0233312 A1 | 8/2015 | Kopecek et al. |
| 2017/0067769 A1* | 3/2017 | Steinert ................ B64C 27/12 |
| 2017/0096974 A1* | 4/2017 | Dudar ................ B60W 20/00 |

FOREIGN PATENT DOCUMENTS

| | | |
|---|---|---|
| DE | 10 2012 208 601 A1 | 12/2012 |
| DE | 102011014412 A1 | 12/2012 |
| EP | 2910755 A1 | 8/2015 |
| WO | 2012/077438 A1 | 6/2012 |

OTHER PUBLICATIONS

European Communication pursuant to Art 94 (3) EPC for EP Application No. 16822880.7 dated Mar. 24, 2020; 6 pgs.
PCT Preliminary Report & International Search Report and Written Opinion; Application No. PCT/AT2016/060119; dated Jul. 3, 2018; 6 pages.

* cited by examiner

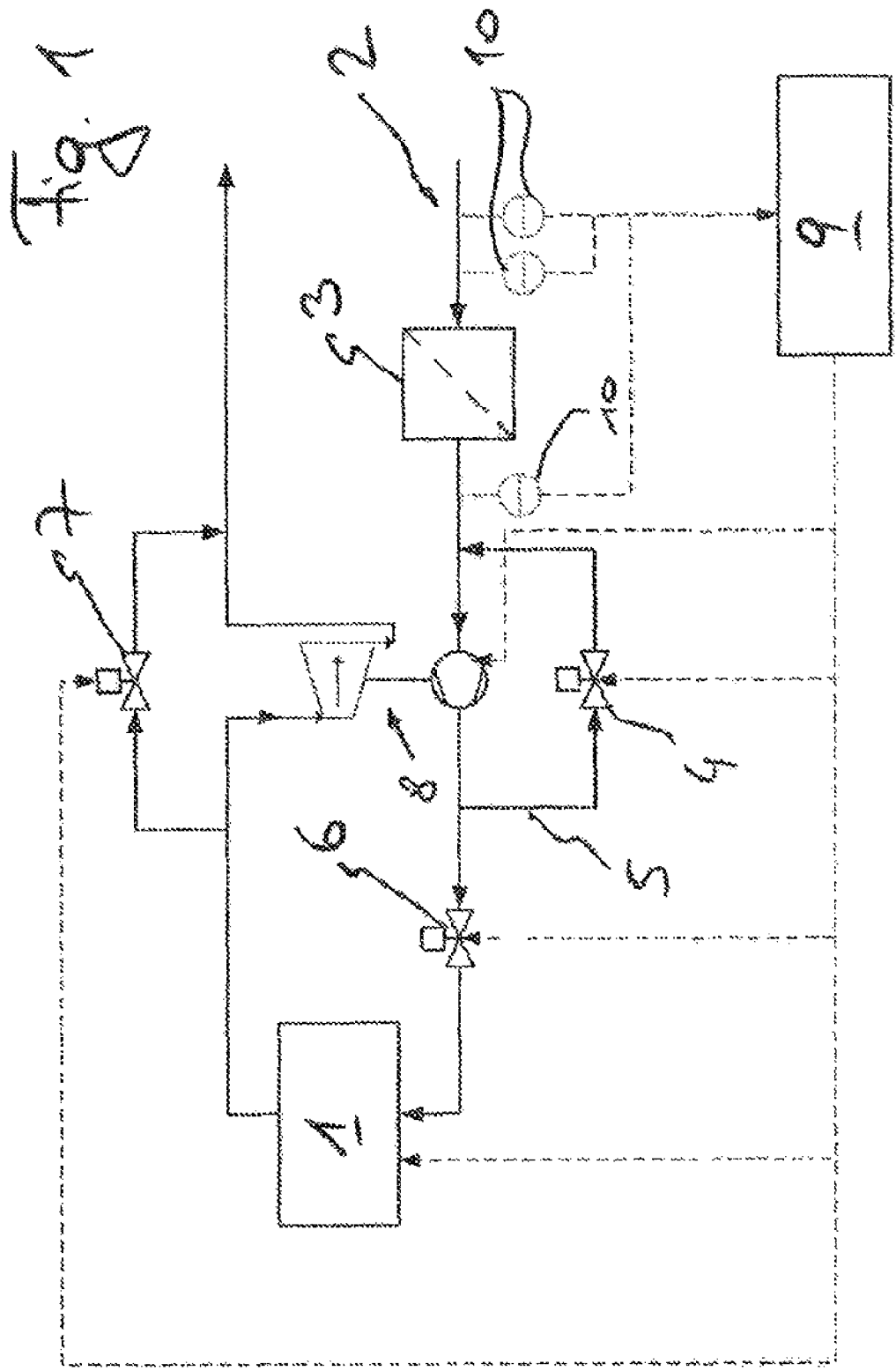

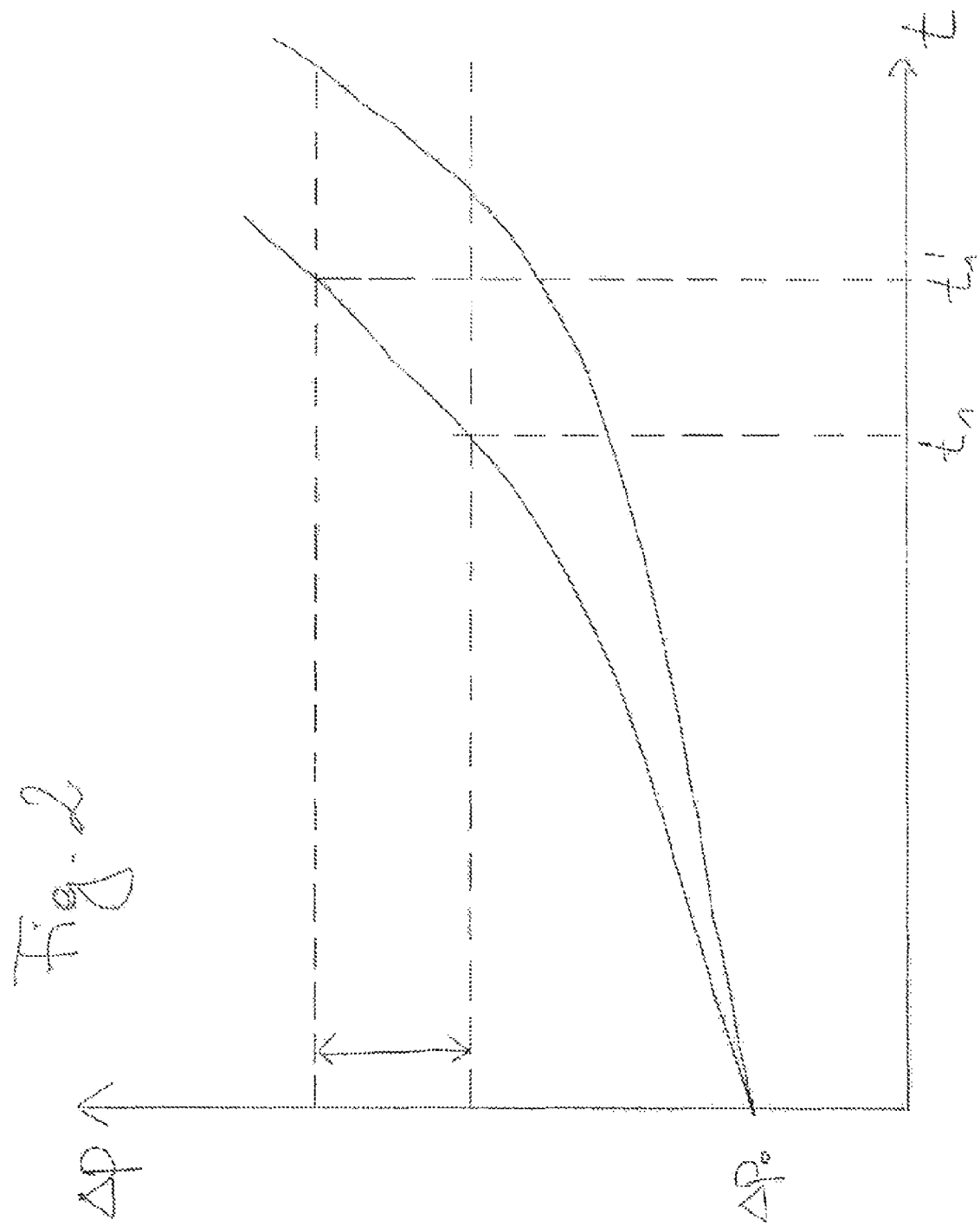

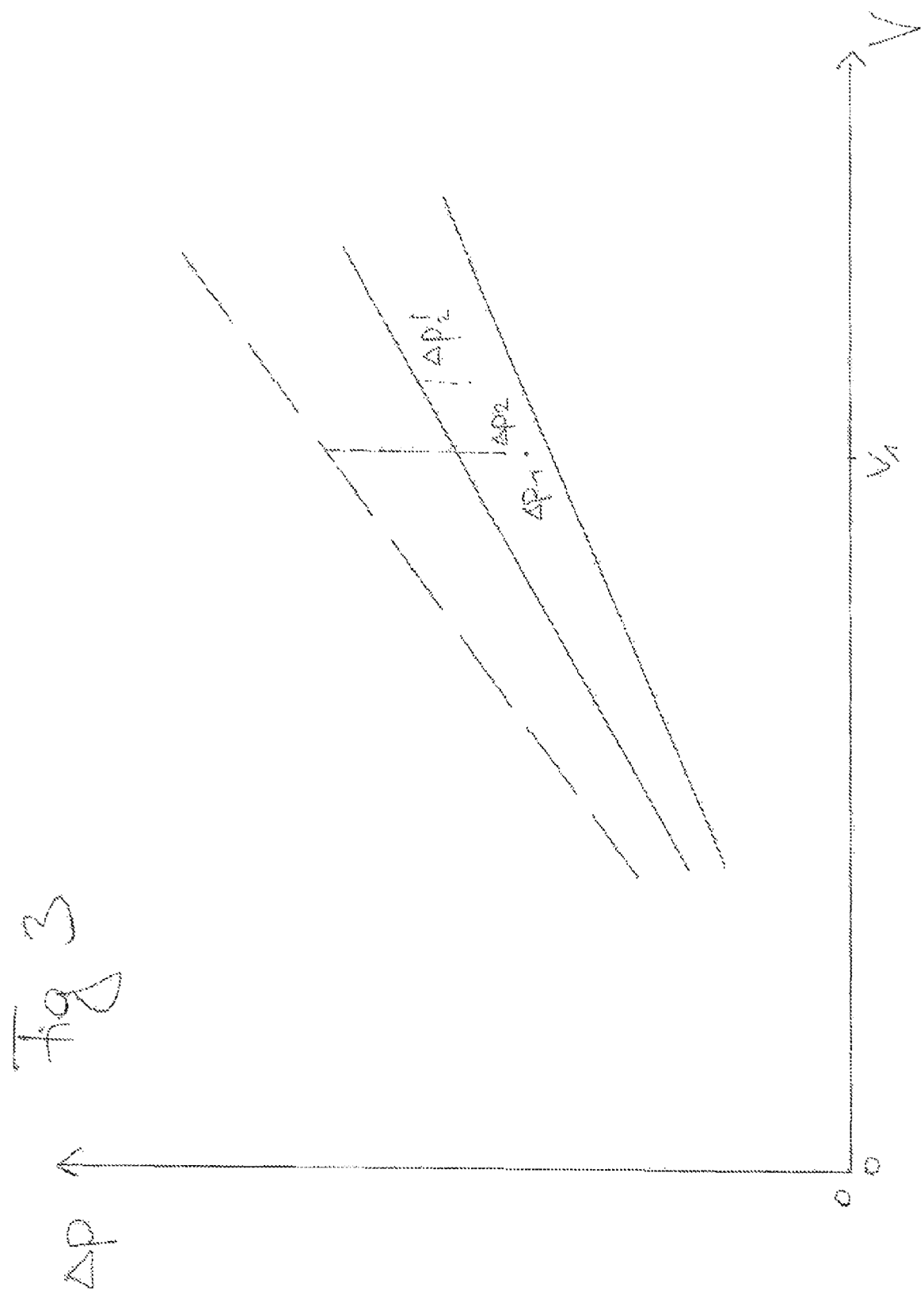

METHOD AND DEVICE FOR CONTROLLING A TURBOCHARGER

TECHNOLOGY FIELD

The present disclosure relates to a method with the features of the preamble of claim 1 and an internal combustion engine with the features of the preamble of claim 9.

BACKGROUND

The degradation (aging or wear) of internal combustion engines in terms of control technology has up to now been compensated by making use of the control reserve of a turbocharger bypass (the control reserve of the turbocharger bypass is given by that control range of the bypass valve which does not have to be provided for the normal operation of the internal combustion engine), wherein the compressor (and/or an exhaust-gas turbine, then it is called a wastegate) of a turbocharger is flowed around by the turbocharger bypass.

In a newly manufactured internal combustion engine this control reserve can be used as an additional pressure drop in an intake tract of the internal combustion engine, as long as the turbocharger is operated within the specified operating limits. With increasing degradation of the internal combustion engine, the control reserve of the turbocharger bypass must be used to compensate for the effects of degradation, so that in the end the additional pressure drop in the intake tract is reduced to the initial value.

Air filters of internal combustion engines are used to separate particles from the charge air and to ensure a certain purity of the charge air. The air filter is thereby subject to an aging process, which is called load, and which traces back to separated particles in the filter media. As a result, the differential pressure (difference of the pressure in the intake tract upstream of the air filter and of the pressure downstream of the air filter) increases in the course of increasing operating hours. This differential pressure is part of the total pressure drop through the intake tract, which leads to an increase in the compression ratio of the turbocharger and a reduced control reserve for the turbocharger bypass. It is therefore necessary to limit the maximum pressure drop and thus the maximum permitted differential pressure via the air filter in order to continue to allow operation of the turbocharger within the operating limits using the control reserve of the turbocharger bypass.

The service life of an air filter depends on the state of the supplied charge air (environmental conditions, dust load) for a given size of the air filter, the operation mode of the internal combustion engine and the specified maximum permitted differential pressure.

U.S. Pat. Nos. 5,606,311 and 8,626,456 describe the measurement of a pressure drop via an air filter and the comparison with a specified maximum permitted differential pressure to determine a degradation of the air filter.

U.S. Pat. No. 8,534,123 reveals the economic optimization of the replacement intervals for an air filter based on fuel consumption, the differential pressure via the air filter and the cost.

U.S. Pat. No. 9,061,224 extrapolates a remaining service life of the air filter.

It has been found that the assessment of the state of an air filter, which is based solely on the differential pressure, commonly causes a too early replacement of such a still usable air filter.

SUMMARY

The object of the disclosure is to provide a generic method and a generic internal combustion engine in which the above-described problems are resolved.

This object is achieved by a method with the features of claim 1 and an internal combustion engine with the features of claim 9. Advantageous embodiments of the disclosure are defined in the dependent claims.

By control reserve in the present disclosure is that control range of a control element meant, which in the normal control operation of the internal combustion engine must not be used.

The remaining control reserve, e.g. of a compressor bypass, which is dependent on the degradation state of an internal combustion engine, can be used to adjust the maximum permitted differential pressure of an air filter and while still maintaining an acceptable control reserve. This increases the service life of the air filter, since a greater maximum permitted differential pressure can be tolerated.

The control reserve (shown here with the example of a compressor bypass) is the ratio between compressor bypass mass flow to compressor total mass flow. The bypass mass flow is derived from the operating pressures and the pressure loss characteristic curve of the valve manufacturer. The total mass flow can be calculated with the knowledge of the person skilled in the art from the cubic capacity of a single combustion chamber, the number of combustion chambers, the volumetric efficiency, the charge-air pressure, the charge temperature and the charge-air density of the internal combustion engine as well as the speed.

As it is known, how big the control reserve is, it can be used to allow a higher maximum permitted differential pressure for the air filter. If the internal combustion engine is degraded, this control reserve decreases and the maximum permitted differential pressure must be reduced.

A remaining control range of a control variable for the current of a fuel-air mixture or an exhaust gas can be used as a control reserve by the internal combustion engine. Examples for such a control reserve, which can be used in any combination, in addition to the position of a bypass valve of a turbocharger bypass, e.g. the position of the throttle valve of the internal combustion engine, are the position of a wastegate, an adjustable geometry of the turbocharger, etc.

In addition or alternatively, a control element for the specific energy density of the fuel-air mixture (lambda value)—for example a gas metering valve—or a control element for the spark ignition time for the spark ignition of a fuel-air mixture in the combustion chambers of the internal combustion engine) can be isolated or used in any combination as a control reserve or for the volumetric efficiency (a variable valve train adjustment) or for an EGR rate (exhaust gas recirculation rate).

It is, in an embodiment provided that a load state of the air filter is being determined. The load state can, for example, be determined by measuring the present differential pressure of the air filter or by weighing the air filter. An appropriate scale can be implemented, for example, in a storage of the air filter so that the measurement can take place during the operation of the internal combustion engine without disassembly of the air filter.

It is, in an embodiment provided to calculate a standard air flow from operating variables of the internal combustion engine (for example, according to the above calculation of the compressor mass flow minus the compressor bypass and propellant gas mass flow using the standard density for air).

The actual present air flow can be calculated in a well-known manner taking into account the ambient pressure and the charge-air temperature from the standard air flow. The comparison of a measured differential pressure via the air filter with the maximum permitted differential pressure can take place for the actually present air flow.

The maximum permitted differential pressure present at a specified time and the differential pressure measured can be reported by a control device of the internal combustion engine to an operator of the internal combustion engine.

The measurement of the actually present differential pressure (which is representative of a load state of the air filter) and of the operating variables of the internal combustion engine for the calculation of the standard air flow and the measurement of the ambient pressure and the charge-air temperature can be done continuously or cyclically.

It is, in an embodiment provided that the degradation of the air filter and also that of the internal combustion engine is monitored and that it gets calculated which maximum permitted differential pressure may be authorized and/or extrapolated into the future and estimated, when the air filter must be replaced.

The internal combustion engine is designed as spark-ignited gas engine. The internal combustion engine is designed as a stationary internal combustion engine, particularly as part of a genset for the production of electrical energy.

BRIEF DESCRIPTION OF THE DRAWINGS

Exemplary embodiments of the disclosure will be explained with reference to the figures. The figures show:

FIG. 1 schematically an internal combustion engine according to the disclosure

FIG. 2 the differential pressure applied via the air filter over the operating hours of an internal combustion engine and FIG. 3 the differential pressure applied via the air filter over the volume flow of the charge air.

DETAILED DESCRIPTION

FIG. 1 shows schematically an internal combustion engine 1 according to the disclosure with an intake tract 2 for charge air which can be supplied to the combustion chambers (not shown) of the internal combustion engine 1 and an air filter 3 arranged in the intake tract 2. The internal combustion engine 1 comprises a throttle valve 6, a wastegate 7, sensors 10 for the measurement of various operating variables and a control device 9 for the control of various control elements. A turbocharger 8 is provided, which can be flowed around a turbocharger bypass 5, depending on the position of a bypass valve 4.

FIG. 2 shows the increase of the differential pressure $\Delta p$ over the number of operating hours for a typical internal combustion engine (for two different operating conditions of the internal combustion engine 1) starting from an initial differential pressure of $\Delta p_0$. Drawn horizontally with dotted lines are two different values of the maximum permitted differential pressure $\Delta p_{max}$. When the differential pressure $\Delta p$ reaches the maximum permitted differential pressure $\Delta p_{max}$, the air filter 3 must be replaced. The higher the maximum permitted differential pressure $\Delta p_{max}$, the later this is the case. In the example shown, the two plotted values for the maximum permitted differential pressure $\Delta p_{max}$ differ by a control reserve of the internal combustion engine 1. By including this control reserve in the calculation of the maximum permitted differential pressure $\Delta p_{max}$, an extension of the operating time of the air filter from time t1 to the time t1' can take place.

FIG. 3 shows a diagram with different operating points p1, p2, p2' of the air filter, wherein the differential pressure $\Delta p$ is applied against the actually present volume flow V. Delineated is the maximum permitted differential pressure $\Delta p_{max}$ (upper solid straight line) in dependence of the actual present volume flow V, and a minimum permitted differential pressure (lower solid straight line), also in dependence of the volume flow V.

If the maximum permitted differential pressure $\Delta p_{max}$ is exceeded, the air filter must be changed. This also applies when the minimum permitted differential pressure drops below, since generally there is a defective air filter then.

Here follows the description of a typical aging process of an air filter based on the diagram in FIG. 3. At the first measurement of the differential pressure $\Delta p$ and the first volume flow V at a first time, a first differential pressure $\Delta p1$ is measured at volume flow V1. With unchanged operating conditions, in particular an unchanged volume flow, a second differential pressure $\Delta p2$ is measured at a later time, which is already closer to the maximum permitted differential pressure $\Delta p_{max}$ (with or without utilization of the control reserve). It can now be estimated how much time remains until the maximum permitted differential pressure $\Delta p_{max}$ is reached (for example, by linear extrapolation).

If the operating conditions since the first measurement have changed (which here is noticeable in an increased volume flow V2), then the second measured differential pressure $\Delta p2'$ will have a different distance to the maximum permitted differential pressure $\Delta p_{max}$. Again, it can now be estimated how much time remains until the maximum permitted differential pressure $\Delta p_{max}$ is reached (for example, by linear extrapolation) even though the operating conditions have changed.

Based on the calculated actual present air flow and a maximum permitted differential pressure ($\Delta p_{max}$) adjusted via the actual present air flow, the load condition and/or the remaining operating time of the air filter (3), particularly in a partial-load operation, of the internal combustion engine can be estimated.

What we claim is:

1. A method, comprising:
   determining a control reserve of an engine control of an internal combustion engine, wherein the engine control has a control range, a portion of the control range is used during normal operation of the internal combustion engine, and the control reserve comprises a remaining portion of the control range that is not intended to be used during normal operation of the internal combustion engine, wherein the control reserve decreases as a first portion of the control reserve is used to compensate for degradation of the internal combustion engine and a second portion of the control reserve is used to compensate for degradation of an air filter; and
   adjusting a maximum permitted differential pressure of the air filter in an intake tract of the internal combustion engine as a function of the decreased control reserve.

2. The method according to claim 1, wherein the engine control has the control range configured to adjust a flow of a fuel-air mixture or an exhaust gas, wherein the engine control comprises at least one of a plurality of engine controls, comprising:

a bypass valve of a turbocharger bypass of the internal combustion engine,
a throttle valve of the internal combustion engine,
a wastegate, and
an adjustable geometry of a turbocharger.

3. The method according to claim 1, wherein the engine control has the control range configured to adjust at least one of a plurality of engine variables, comprising:
a specific energy density of a fuel-air mixture,
an ignition time for a spark ignition of the fuel-air mixture in combustion chambers of the internal combustion engine,
a volumetric efficiency, and
an exhaust gas recirculation (EGR) rate.

4. The method according to claim 1, further comprising determining a load state of the air filter.

5. The method according to claim 1, further comprising calculating a standard air flow from operating variables of the internal combustion engine,
calculating an actual present air flow considering an ambient pressure and a charge-air temperature from the standard air flow, and
comparing a measured differential pressure via the air filter with the maximum permitted differential pressure for the actual present air flow.

6. The method according to claim 5, comprising obtaining the measured differential pressure and the operating variables of the internal combustion engine continuously or cyclically.

7. The method according to claim 1, further comprising estimating based on a calculated actual present air flow and the maximum permitted differential pressure adjusted via the calculated actual present air flow, a load condition and/or a remaining operating time of the air filter, in a partial-load operation, of the internal combustion engine.

8. The method according to claim 1, wherein adjusting the maximum permitted differential pressure of the air filter comprises decreasing the maximum permitted differential pressure as the function of the decreased control reserve.

9. An internal combustion engine comprising:
at least one air filter arranged in an intake tract of the internal combustion engine; and
a controller configured to store a maximum permitted differential pressure for the at least one air filter;
wherein the controller is configured to determine a control reserve of an engine control of the internal combustion engine and the maximum permitted differential pressure of the at least one air filter from measurement values of an at least one sensor and operating data of the internal combustion engine as a function of the determined control reserve;
wherein the engine control has a control range, a portion of the control range is used during normal operation of the internal combustion engine, and the control reserve comprises a remaining portion of the control range that is not intended to be used during normal operation of the internal combustion engine, wherein the control reserve decreases as a first portion of the control reserve is used to compensate for degradation of the internal combustion engine and a second portion of the control reserve is used to compensate for degradation of the at least one air filter, and wherein the maximum permitted differential pressure is adjusted based on the decreased control reserve.

10. The internal combustion engine according to claim 9, wherein the engine control has the control range configured to adjust a flow of a fuel-air mixture or an exhaust gas, wherein the engine control comprises at least one of a plurality of engine controls, comprising:
a bypass valve of a turbocharger bypass of the internal combustion engine,
a throttle valve of the internal combustion engine,
a wastegate, and
an adjustable geometry of a turbocharger.

11. The internal combustion engine according to claim 9, wherein the engine control has the control range configured to adjust at least one of a plurality of engine variables, comprising:
a specific energy density of a fuel-air mixture,
an ignition time for a spark ignition of a fuel-air mixture in combustion chambers of the internal combustion engine,
a volumetric efficiency, and
an exhaust gas recirculation (EGR) rate.

12. The internal combustion engine according to claim 9, wherein the controller is configured to determine a load state of the at least one air filter.

13. The internal combustion engine according to claim 9, wherein the controller is configured to:
calculate a standard air flow from operating variables of the internal combustion engine,
calculate an actual present air flow considering an ambient pressure and a charge air temperature from the standard air flow, and
compares a measured differential pressure via the at least one air filter with the maximum permitted differential pressure for an actual present air flow.

14. The internal combustion engine according to claim 9, wherein the controller is configured to measure an actual present differential pressure and operating variables of the internal combustion engine for calculation of a standard air flow, and the controller is configured to measure an ambient pressure and a charge-air temperature, continuously or cyclically.

15. A method, comprising:
determining a pressure difference across an air filter of an intake of an internal combustion engine as a function of a control reserve of an engine control of the internal combustion engine, wherein the engine control has a control range, a portion of the control range is used during normal operation of the internal combustion engine, and the control reserve comprises a remaining portion of the control range that does not have to be used during normal operation of the internal combustion engine, wherein the control reserve decreases as a first portion of the control reserve is used to compensate for degradation of the internal combustion engine and a second portion of the control reserve is used to compensate for degradation of the air filter.

16. The method according to claim 15, comprising using the second portion of the control reserve to compensate for degradation of the air filter to extend a life of the air filter with the internal combustion engine.

17. The method according to claim 16, wherein using the second portion of the control reserve comprises increasing a maximum permitted value of the pressure difference across the air filter, and the maximum permitted value indicates an end of the life of the air filter.

18. The method according to claim 17, comprising delaying service on the internal combustion engine due to an extended life of the air filter attributed to using the second portion of the control reserve.

19. The method of claim 15, wherein the engine control has the control range configured to adjust a flow of a fuel-air mixture or an exhaust gas, wherein the engine control selectively includes each of a plurality of engine controls, comprising:
- a bypass valve of a turbocharger bypass of the internal combustion engine,
- a throttle valve of the internal combustion engine,
- a wastegate, and
- an adjustable geometry of a turbocharger.

20. The method according to claim 15, wherein the engine control has the control range configured to selectively adjust each of a plurality of engine variables, comprising:
- a specific energy density of a fuel-air mixture,
- an ignition time for a spark ignition of the fuel-air mixture in combustion chambers of the internal combustion engine,
- a volumetric efficiency, and
- an exhaust gas recirculation (EGR) rate.

* * * * *